United States Patent [19]

Sugaya et al.

[11] Patent Number: 5,768,476
[45] Date of Patent: Jun. 16, 1998

[54] PARALLEL MULTI-VALUE NEURAL NETWORKS

[75] Inventors: Fumiaki Sugaya, Tokyo; Youtaro Yatsuzuka, Kanagawa, both of Japan

[73] Assignee: Kokusai Denshin Denwa Co., Ltd., Tokyo, Japan

[21] Appl. No.: 406,905

[22] PCT Filed: Aug. 12, 1994

[86] PCT No.: PCT/JP94/01341

§ 371 Date: Mar. 29, 1995

§ 102(e) Date: Mar. 29, 1995

[87] PCT Pub. No.: WO95/05640

PCT Pub. Date: Feb. 23, 1995

[30] Foreign Application Priority Data

Aug. 13, 1993 [JP] Japan .................. 5-220484
Mar. 9, 1994 [JP] Japan .................. 6-064428

[51] Int. Cl.[6] ............................ G06F 15/18
[52] U.S. Cl. ................ 395/21; 395/21; 395/23; 364/746.2
[58] Field of Search ................ 364/737, 739, 364/746, 746.2; 395/20–23

[56] References Cited

U.S. PATENT DOCUMENTS

| | | | |
|---|---|---|---|
| 3,659,089 | 4/1972 | Payne | 364/739 |
| 3,798,606 | 3/1974 | Henle | 340/172.5 |
| 4,296,494 | 10/1981 | Ishikawa | 371/13 |
| 4,949,293 | 8/1990 | Kawamura | 364/746 |
| 5,053,974 | 10/1991 | Penz | 395/27 |
| 5,095,443 | 3/1992 | Watanabe . | |
| 5,216,750 | 6/1993 | Smith | 395/22 |
| 5,227,993 | 7/1993 | Yamakawa | 364/746.2 |
| 5,253,328 | 10/1993 | Hartman | 395/23 |
| 5,293,457 | 3/1994 | Arima | 395/24 |
| 5,309,525 | 5/1994 | Shimomura | 382/50 |
| 5,329,611 | 7/1994 | Pechanek | 395/27 |
| 5,524,178 | 6/1996 | Yokono | 395/23 |

FOREIGN PATENT DOCUMENTS 2-178759  7/1990  Japan .

*Primary Examiner*—Tariq R. Hafiz
*Assistant Examiner*—Jeffrey S. Smith
*Attorney, Agent, or Firm*—Nikaido Marmelstein Murray & Oram LLP

[57] ABSTRACT

In a parallel multi-value neural network having a main neural network 16 and a sub neural network 18 coupled with the main neural network 16 in parallel for an input signal, the main neural network 16 is trained with a training input signal by using a main multi-value teacher signal, and the sub neural network is successively trained with the training input signal by using multi-value errors between a multi-value output signal of the main neural network 16 derived through a multi-value threshold means 17 and the main multi-value teacher signal, so as to compensate the multi-value errors involved in the multi-value output signal of the main neural network 16 by the multi-value output signal of the sub neural network 18 derived through a multi-value threshold means 19. A desired multi-value output signal of the parallel multi-value neural network 15 is obtained by adding in modulo the multi-value output signals of both the neural networks through a multi-value modulo adder 20.

5 Claims, 17 Drawing Sheets

PARALLEL MULTI-VALUE NEURAL NETWORKS

BACKGROUND OF THE INVENTION

The present invention relates to parallel multi-value neural networks which are applied to large scale multi-value logic circuits, pattern recognition, associative memories, code conversions and image processing, providing a desired multi-value output signal with stable and rapid convergence.

In the prior art, a multi-layered neural network and a mutually interconnected neural network such as a Hopfield network have been applied to various information processing as described in text books, for instance, "Neural Network Information Processing" by H. Aso and "Parallel Distributed Processing" by D. E. Rumelhart, MIT Press. FIG. 1 illustrates a 3-layered neural network 1 which has an input layer 4, a hidden layer 5 and an output layer 6 for the execution process. As is well known, the N elements of an input signal I are input to the corresponding units of the input layer 4 through an input terminal 2. The weighted outputs of units of the input layer 4 are added together, and a threshold value is subtracted from the result, and the result is then fed through a sigmoidal function into units of the next layer. The output signal O is obtained from the M output units of the output layer 6 through an output terminal 3.

FIG. 2 illustrates a mutually interconnected neural network having one layer with N units. The network has hidden units and units connected with the input and the output through weighting factors. At an equilibrium state, the output signal O is obtained through the terminal 3.

FIG. 3 illustrates a configuration of the 3-layered neural network 1 in a learning process. A back propagation algorithm is well known for updating weighting factors to minimize the power of the difference between a given teacher signal and the output signal of the output layer 6 for a training input signal fed to the input layer 4 through the terminal 2. The difference obtained through a subtracter 9 is fed into a weighting factor controller 10 which calculates the amount of adjustment of weighting factors for the 3-layered neural network 1. The weighting factors from the terminal 11' are updated and fed back into the neural network 1 through the terminal 11. When the neural network 1 converges in the learning process, the output signal for the training input signal becomes very close to the teacher signal. The back propagation algorithm has however the following disadvantages. For example, the neural network 1 was frequently trapped in a state having local minima which are sub-optimum for minimizing the difference power, and could not easily release the state even if the number of training cycles was increased. It is therefore difficult to make the neural network 1 converge completely without errors between the teacher signal and the output signal within a small number of training cycles. The same situation also occurred for a multi-value teacher signal.

After falling into the state with the local minima, the learning process cannot advance effectively, thereby wasting training cycles. Heuristic approaches are only applied to conventional neural networks by changing the initial conditions of the weighting factors and/or increasing the number of hidden units or the layers, resulting in a huge increase of calculation and a complex hardware configuration. The achievement of rapid and stable convergence without initial weighting factor sensitivity is generally one of the major issues in neural networks having a small number of hidden units and/or multi-layers for a wide range of applications.

FIG. 4 illustrates a configuration of the mutually interconnected neural network 7 in the learning process. In the mutually interconnected neural network 7, an equilibrium state of the network becomes stable with optimum weighting factors, and provides the output signal for the training input signal. In a weighting factor processor 12, optimum weighting factors are calculated from a stored initial input signal S including a teacher signal to provide the equilibrium state having a minimum energy, and then are set in the network 7 through a terminal 14. It is generally difficult to achieve both the equilibrium state providing a minimum energy and the desired output signal for the training input signal. Accordingly, the equilibrium state can only be achieved by using a large number of hidden units.

As aforementioned, a clear approach for obtaining convergence of neural networks with a minimum complexity and a small number of training cycles could not be found.

FIG. 5 also illustrates another example of a parallel neural network 61 which was described in U.S. Pat. No. 5,095,443. In this network, two neural networks 62 and 63 are connected in parallel for the input signal. The second neural network 63 is for suppressing the difference of the output signal of the first neural network 62 from a first teacher signal via the output signal of the second neural network 63 at an adder 64 to obtain a more precise output signal of the parallel neural network 61 for the training input signal.

In the learning process, the first neural network 62 is trained at first with the training input signal by using the first teacher signal. The learning process is usually continued until either the power of the difference becomes almost non-variant due to local minima, or the number of training cycles increases beyond the predetermined value. It is however difficult to decide whether the output signal of the sub neural network 63 at the local minima is or is not sufficient to suppress the difference in the output signal of the first neural network 62 via the output signal of the second neural network 63 at the adder 64 in the execution process. Hence it is difficult to finalize the learning process within an optimum number of training cycles.

After training the first neural network 62, the teacher signal for the second neural network 63 is obtained by subtracting the output signal of the first neural network 62, which has been trained, from the first teacher signal. The training of the second neural network 63 is then carried out with the same training input signal. The second neural network 63 learns the difference in the output signal of the first neural network 62 from the first teacher signal so that the sum of the output signal derived from the first neural network 62 which has been trained and the output signal derived from the second neural network 63 which has been trained becomes close to the first teacher signal. For the case of p neural networks connected in parallel, the p-th neural network is trained with a teacher signal obtained by subtracting the sum of the output signals of other trained neural networks from the first teacher signal. The output signal of the parallel neural network 61 is derived by summing the output signal of each neural network for the input signal by the adder 64.

As aforementioned, it is also very difficult to determine whether the learning of the neural network concerned should be terminated or continued, and furthermore, whether another neural network should be connected in parallel or not for achieving more precise convergence of the parallel neural network 61.

The decision about convergence of the parallel multi-value neural network 61 in the learning process which does not include a clear decision phase due to continuously available output signals is very difficult. These defects also induce an increase of the number of neural networks connected in parallel and of the learning calculation to provide a satisfactory output signal of the parallel neural network 61. This neural network 61 cannot be applied to a multi-value logic circuit.

These conventional neural networks cannot provide clear design criteria concerning complexity and training cycles.

The present invention of a parallel multi-value neural network can resolve these problems by providing a stable and quick convergence property and independence of initial weighting factors with a small number of neural networks connected in parallel, a small number of hidden units in the hidden layer, and a minimum amount of learning calculation.

SUMMARY OF THE INVENTION

It is an object, therefore, of the present invention to overcome the disadvantages and limitations of conventional neural networks.

It is also an object of the present invention to provide a parallel multi-value neural network which handles discrete multi-values, and has rapid and stable complete convergence within a very small number of training cycles and wide generalization by using one or two sub neural networks in parallel.

The above and other objects are attained by the parallel multi-value neural network 15 for an execution process comprising: a main neural network 16; at least one sub neural network 18 which is coupled with the main neural network 16 in parallel for an input signal; at least two multi-value threshold means 17, 19 which provide discrete multi-value output signals of the main and sub neural networks 16, 18, respectively by quantizing an output of the neural networks into a multi-value; and a multi-value modulo adder 20 to completely cancel multi-value errors involved in the multi-value output signal of the main neural network 16 by adding in modulo the multi-value output signal of the sub neural network 18 to the multi-value output signal of the main neural network 16 so as to provide a correct multi-value output signal of the parallel multi-value neural network 15 for a training input signal.

The main neural network 15 is trained at first with the training input signal by using a main multi-value teacher signal, the sub neural network 18 is then trained in turn by using a compensatory multi-value teacher signal which is derived from subtracting in modulo the multi-value output signal of the main neural network 16 from the main multi-value teacher signal, and the sub neural network 18 is trained until coincidence between the multi-value output signal of the sub neural network 18 and the compensatory multi-value teacher signal is detected for the training input signal.

Multi-value errors involved in the multi-value output signal of the main neural network 16 for the training input signal in the execution process can be compensated by using the multi-value output signal of the sub neural network 18 through the multi-value modulo adder 20. The parallel multi-value neural network 15 can therefore completely converge to provide the correct multi-value output signal within a very small number of training cycles for the training input signal, and to provide a wide generalization for a non-training input signal.

By using a compensatory multi-value teacher signal derived through a code conversion, in which at least some parts of the codes corresponding to the multi-value errors involved in the multi-value output signal are converted, the sub neural network can be also trained, and the multi-value output signal corresponding to the converted codes is then inverted to the original codes before feeding to the multi-value modulo adder 20. The sub neural network 18 more easily converges within a very small number of training cycles.

BRIEF DESCRIPTION OF THE DRAWINGS

The foregoing and other objects, features, and attendant advantages of the present invention will be better understood by means of the following descriptions and accompanying drawings wherein.

DESCRIPTION OF THE PREFERRED EMBODIMENTS

Embodiments of the parallel multi-value neural network according to the present invention are illustrated for structures having only one or two sub neural networks connected in parallel in the detailed descriptions given hereafter.

Descriptions of the parallel multi-value neural network are also separately given for the execution and learning processes, respectively. In the execution process the parallel multi-value neural network executes for the input signal, and in the learning process the main and sub neural networks are successively trained to optimize weighting factors so as to converge them.

(Embodiment 1)

In a first embodiment of the present invention, a parallel multi-value neural network 15 is provided in which a main multi-layered neural network 16 and a sub multi-layered neural network 18 connected in parallel are used, and the multi-value (i.e., more than two values) errors involved in the multi-value output signal of the main neural network 16 are compensated with the multi-value output signal of the sub neural network 18 through a multi-value modulo adder 20 so as to provide a correct multi-value output signal of the parallel multi-value neural network 15 for the training input signal.

Figure 1:
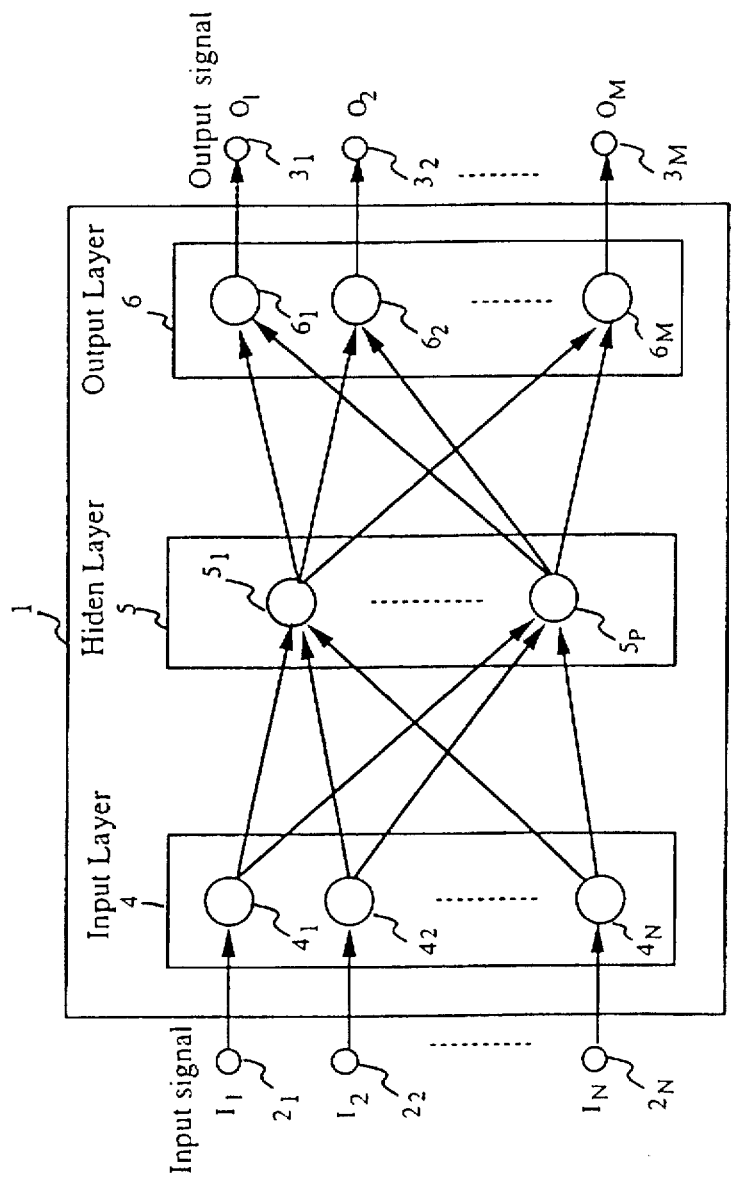
FIG. 1 is a functional diagram of a conventional three layered neural network 1 for execution.
Figure 2:
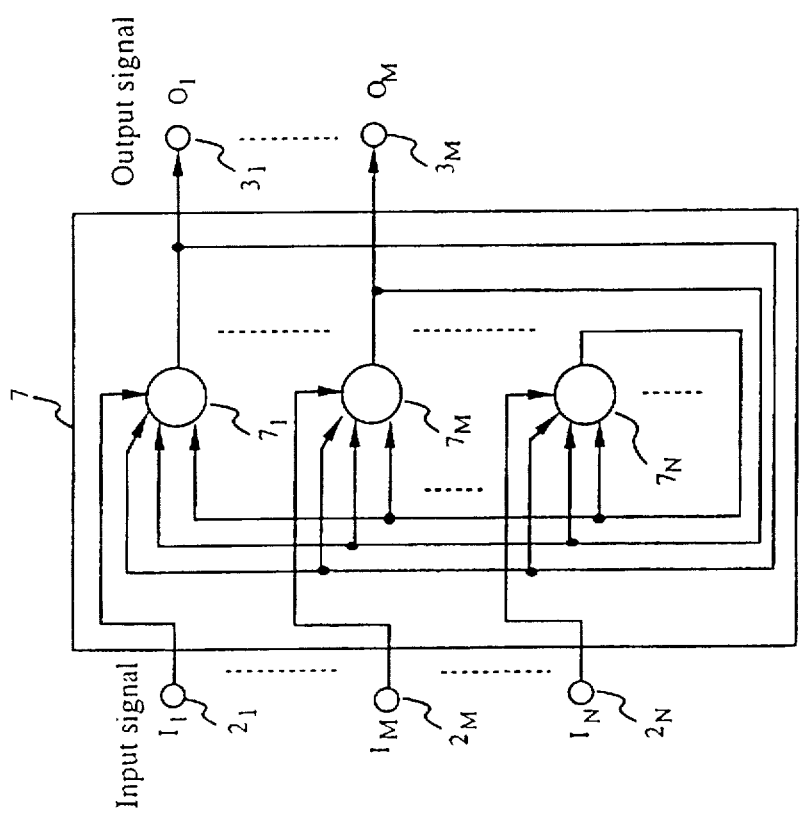
FIG. 2 is a functional diagram of a conventional mutually interconnected neural network 7 for execution.
Figure 3:
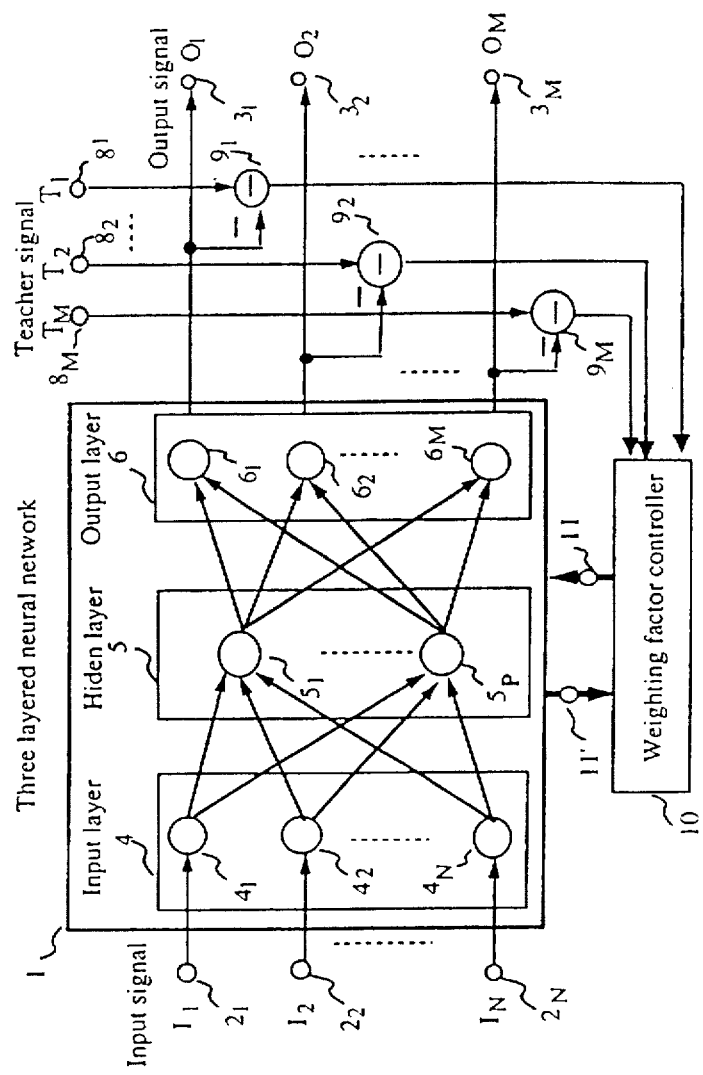
FIG. 3 is a functional diagram of a conventional three layered neural network 1 for learning.
Figure 4:
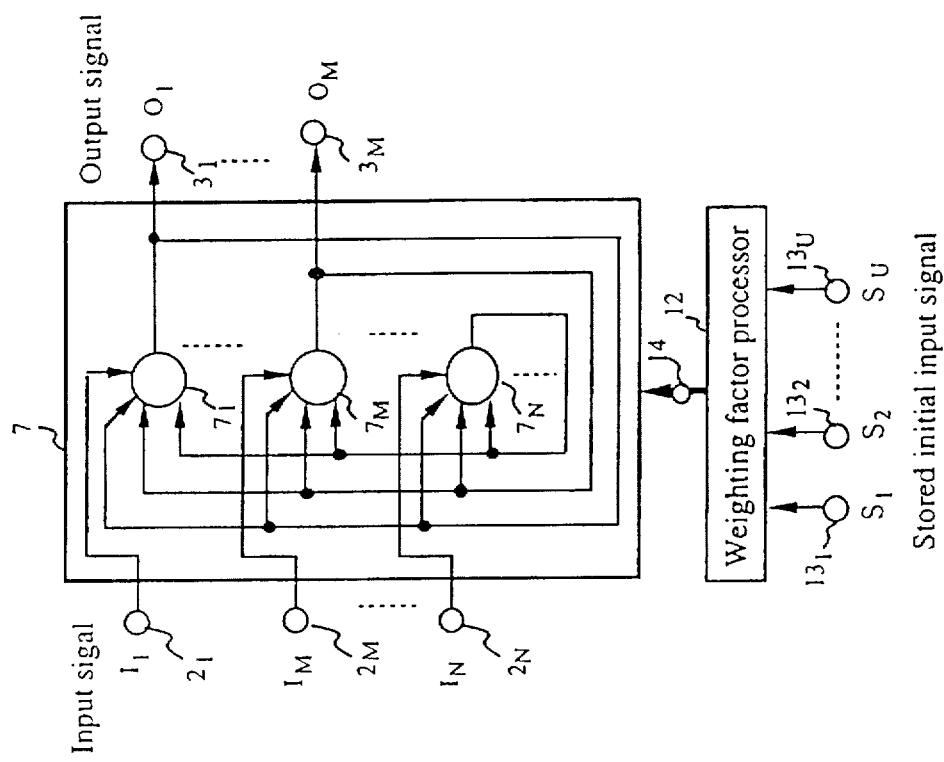
FIG. 4 is a functional diagram of a conventional mutually interconnected neural network 7 for learning.
Figure 5:
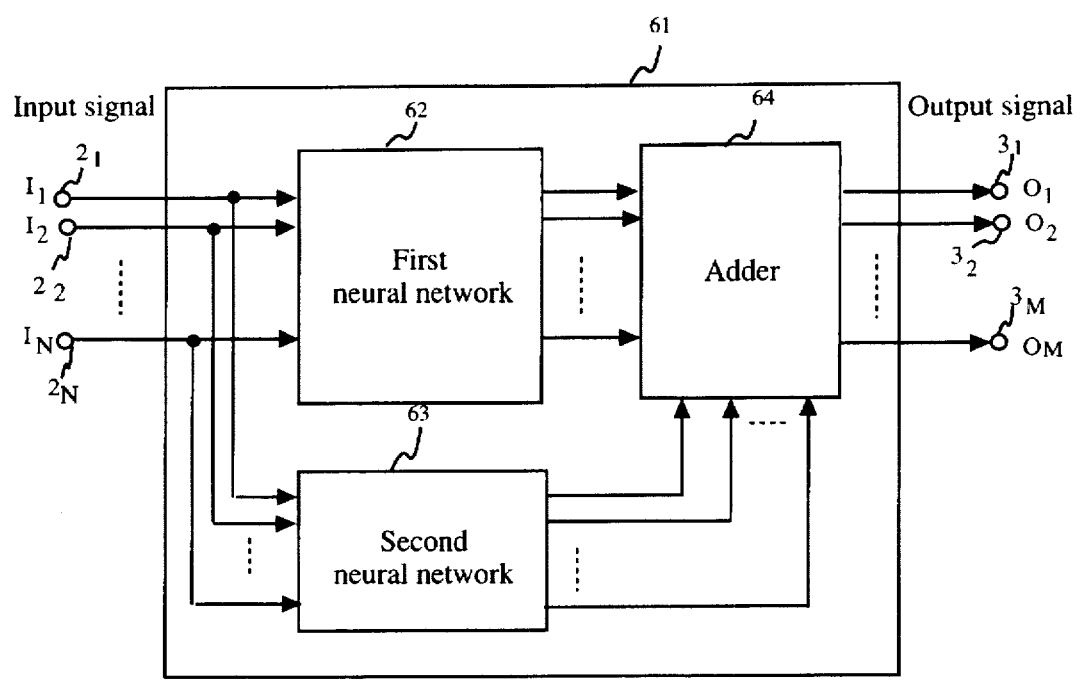
FIG. 5 is a functional diagram of a conventional parallel neural network 61 for execution.
Figure 6:
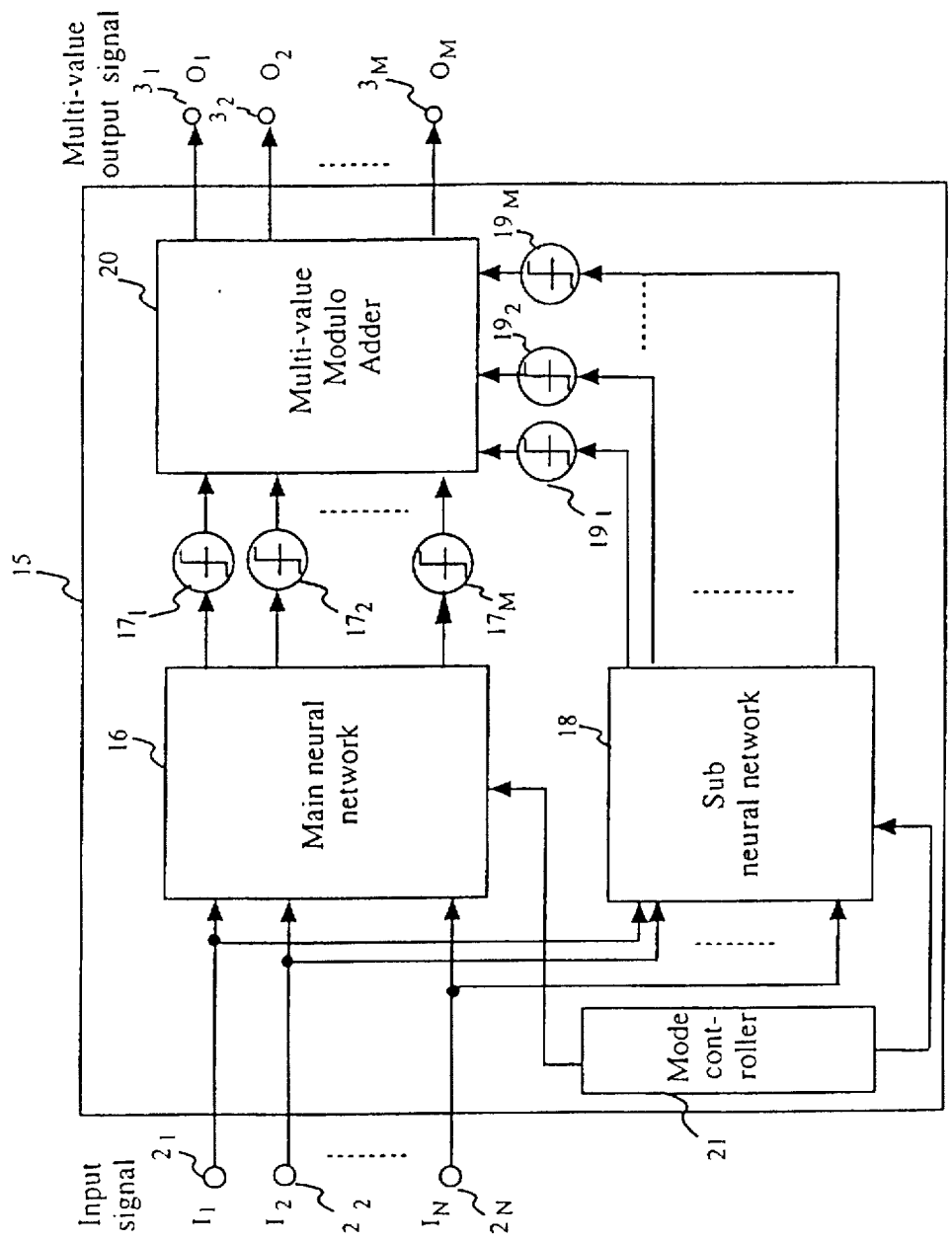
FIG. 6 is a functional diagram of a first embodiment of a parallel multi-value neural network 15 for execution, according to this invention.

The parallel multi-value neural network 15 in the execution process, as illustrated in FIG. 6, comprises the main neural network 16, the sub neural network 18 in parallel for the input signal fed through a terminal 2, multi-value threshold means 17 and 19 to output discrete multi-values for the output signals of the main and sub neural networks 16, 18, respectively, the multi-value modulo adder 20 to add in modulo the multi-value outputs derived from the multi-value threshold means of 17 and 19, and a mode controller 21 to control the main and sub neural networks for setting the weighting factors obtained in the learning process and performing of the execution process. The multi-value output signal of the parallel multi-value neural network 15 is obtained through a terminal 3.

Figure 7:
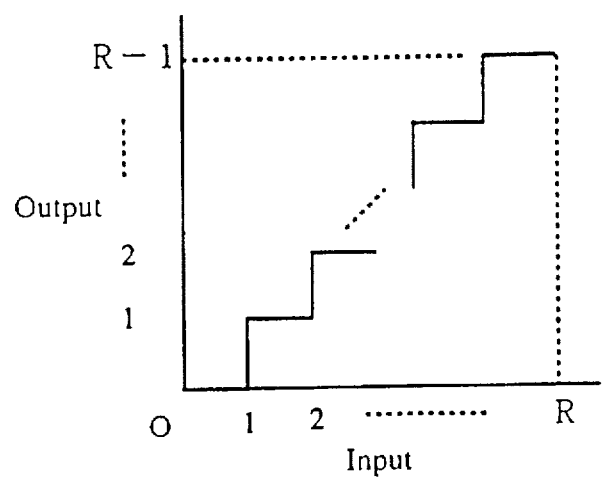
FIG. 7 is a characteristic of a multi-value (R-levels) threshold means 17, 19 between the input and the output.

The multi-value threshold means 17, 19 provide a discrete R-ry output corresponding to the input under a relation given in FIG. 7. In the multi-value modulo adder 20, the multi-value outputs X and Y derived from the multi-value threshold means 17 and 19 are added in modulo. The i-th element Zi of the multi-value output Z of the multi-value modulo adder 20, which is a vector, is given by $$Zi=(Xi+Yi)\bmod(R),$$

where Xi and Yi are the i-th elements of the multi-value output vector of the multi-value threshold means 17 and 19, respectively. In order to cancel the multi-value errors involved in the multi-value output signal of the main neural network 16 which has been trained with the training input signal by the multi-value output signal of the sub neural network 18 which has been trained, the multi-value modulo adder 20 adds in modulo the multi-value output signal of the sub neural network 18 to that of the main neural network 16, and outputs the multi-value output signal O of the parallel multi-value neural network 15 in the execution process.

Figure 8:
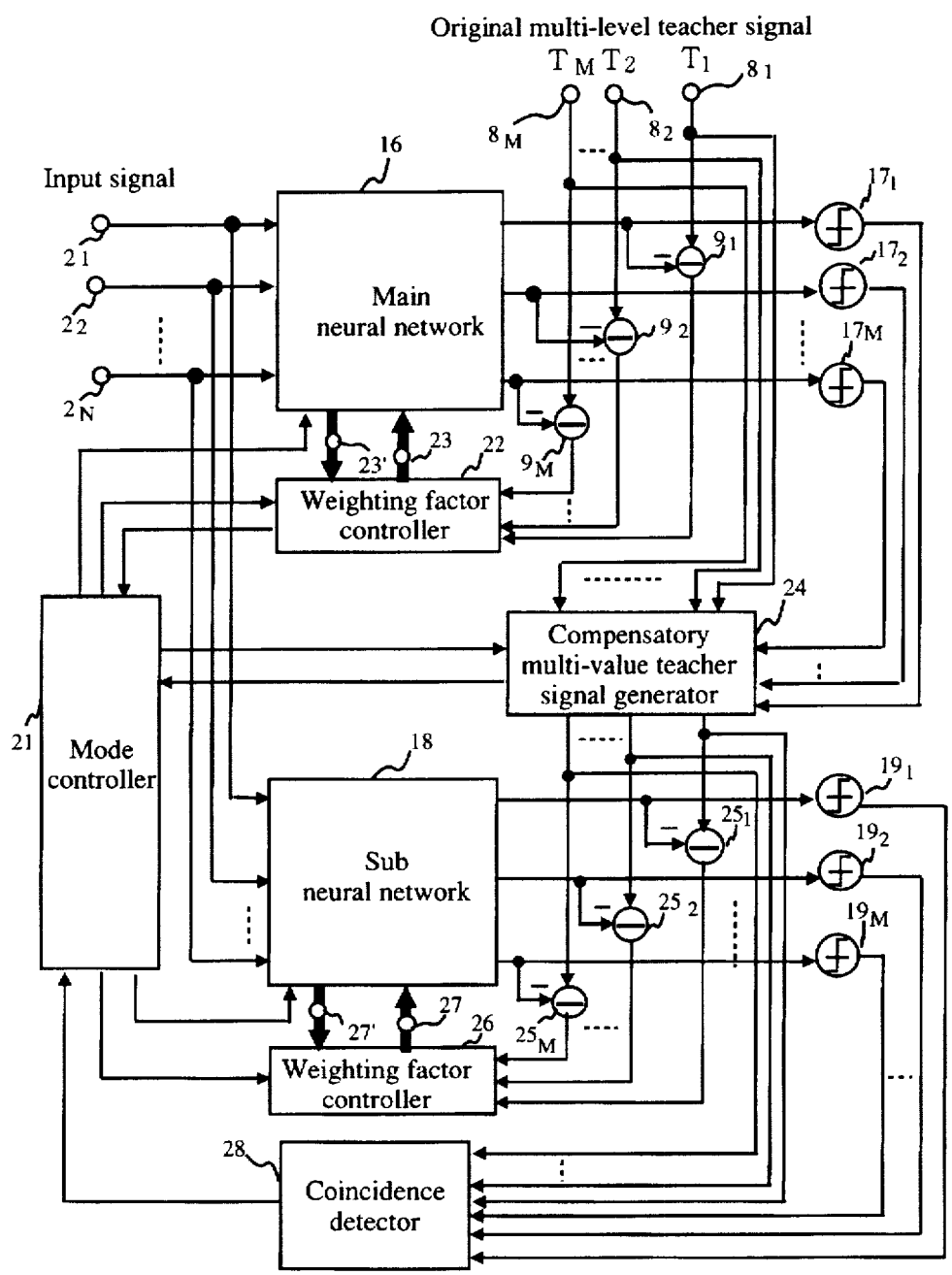
FIG. 8 is a functional diagram of the first embodiment of the parallel multi-value neural network 15 for learning, according to this invention.

The parallel multi-value neural network 15 in the learning process, as illustrated in FIG. 8, comprises the main neural network 16, the sub neural network 18, subtracters 9 and 25 to obtain the differences between the multi-value teacher signal and the output signal of the main neural network 16 and of the sub neural network 18, respectively, a compensatory teacher signal generator 24 to provide the compensatory multi-value teacher signal for the sub neural network 18, the multi-value threshold means 17, 19, weighting factor controllers 22, 26 to update the weighting factors to minimize the power of the differences, a coincidence detector 28 to detect coincidence between the compensatory multi-value teacher signal and the multi-value output signal of the sub neural network 18, and the mode controller 21 to control both neural networks 16, 18, the weighting factor controllers 22, 26, and the compensatory multi-value teacher signal generator 24.

The main neural network 16 is at first trained with the training input signal by using the main multi-value teacher signal. The updating of the weighting factors in the main neural network 16 is conducted in the weighting factor controller 22 to minimize the power of the difference of the output signal of the main neural network 16 from the main multi-value teacher signal through the subtracter 9. The learning process for the main neural network 16 is terminated by a control signal from the mode controller 21 when the number of erroneous multi-value output signals different from the main multi-value teacher signal in the mode controller 21 falls below a given threshold. The termination may be also determined by either the number of training cycles or time which exceeds a given threshold.

Monitoring of the number of erroneous multi-value output signals in the mode controller 21 is very effective for judging whether the learning process should be continued or terminated, even if the main neural network 16 has local minima. Because the number of erroneous multi-value output signals can easily estimate the possibility of complete convergence of the sub neural network 18 with the compensatory multi-value teacher signal.

Figure 9:
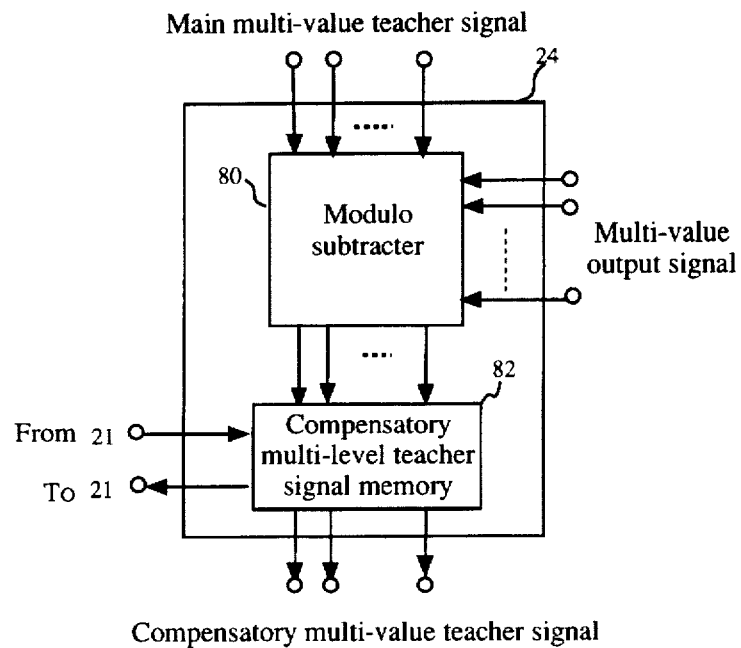
FIG. 9 is a functional configuration of a compensatory multi-value teacher signal generator 24 in a first embodiment of the parallel multi-value neural network 15.

After terminating the learning of the main neural network 16, the compensatory multi-value teacher signal for the sub neural network 18 is obtained by subtracting in modulo the multi-value output signal of the main neural network 16 which has been trained from the main multi-value teacher signal in the compensatory teacher signal generator 24. The compensatory multi-value teacher signal TC is given by the multi-value error E in the multi-value output signal X different from the main multi-value teacher signal T, where E, X and T being vectors related by the following equation, $$Ei=(R+Ti-Xi)\bmod(R),$$

$$TCi=Ei,$$

where i indicates the element number of the vectors. This process is performed through a multi-value modulo subtracter 80 in the compensatory multi-value teacher signal generator 24, as shown in FIG. 9.

The compensatory multi-value teacher signal generator 24 comprises the multi-value modulo subtracter 80 and a compensatory multi-value teacher signal memory 82 which is controlled by the mode controller 21 to store the compensatory multi-value teacher signal when the learning of the main neural network 16 is terminated.

After terminating the learning of the main neural network 16, the sub neural network 18 then starts the learning for updating the weighting factors in the weighting factor controller 26 so as to minimize the power of the difference of the output signal obtained through the subtracter 25 from the compensatory multi-value teacher signal. The learning process is terminated by a control signal from the mode controller 21, when complete coincidence between the multi-value output signal and the compensatory multi-value teacher signal is detected by the coincidence detector 28. If coincidence is not detected within the predetermined number of training cycles, the number of hidden units is increased and the sub neural network 18 is trained again from the initial conditions.

Detection of coincidence indicates that the sub neural network 18 has been converged, resulting in achievement of the complete correct multi-value output signal for the training input signal in the parallel trained multi-value neural network 15, and is very effective to avoid unnecessary training cycles and also unnecessary sub neural networks in parallel.

The parallel multi-value neural network 15 therefore provides a completely correct multi-value output signal for the training input signal in the execution process.

This denotes that if the sub neural network 18 can completely converge for the training input signal, the multi-value output signal of the main neural network 16 in a small number of training cycles does not necessarily coincide with the main multi-value teacher signal.

To provide the correct multi-value output signal coincident with the main multi-value teacher signal under complete convergence of the sole main neural network 16, a huge number of training cycles is necessary in general, and it is impossible in many cases due to the local minima.

A rate of 10 to 15% of the erroneous multi-value output signals to the multi-value output signal of the main neural network 16 caused by the difference from the main multi-value teacher signal can be easily attained within a very small number of training cycles, and the compensatory multi-value teacher signal having a small number of clusters consisting of codes corresponding to the multi-value errors makes the sub neural network 18 converge easily and reliably within a few number of training cycles.

The minimum number of training cycles of both the main and sub neural network 16 and 18 and a small number of distinct codes (clusters) in the compensatory multi-value teacher signal for the sub neural network 18 can also provide a wider generalization for the input signal, outputting the correct multi-value output signal for the training input signal. The complexity of the parallel multi-value neural network 15 also becomes a minimum, having the least number of sub neural networks and also the least number of hidden units so as to provide the correct multi-value output signal.

This performance mainly results from the facts that a compensatory multi-value teacher signal having a very small number of clusters can be used in the learning process to achieve complete coincidence with the multi-value output signal within a very small number of training cycles, and the main neural network 16, even when trapped in local minima, can provide a compensatory multi-value teacher signal having the property described above within a small number of training cycles.

Weighting factors with small bits in the main and sub neural networks can be implemented by introducing multi-value threshold means 17, 19 and the multi-value modulo operations without any sacrifices in precision to obtain the correct multi-value output signal of the parallel multi-value neural network 15. When a parallel binary neural network is assumed, the multi-value modulo operations become only XOR. The initial conditions of the weighting factors become almost independent of the performance of the parallel multi-value neural network due to allowance of states with local minima in the main neural network 16.

Through computer simulations of a binary mapping from a 75-bit input to a 7-bit distributed output it was found that the parallel binary neural network with 75 units for the input layer, 20 units for the hidden layer and 7 units for the output layer required only 210 training cycles, in comparison to more than 20,000 training cycles for a conventional binary neural network with a very similar complexity having 75 units for the input layer, 40 units for the hidden layer and 7 units for the output layer.

By designing the small numbers of hidden units of the main and sub neural networks with weighting factors having small bits, a huge reduction of hardware complexity and calculation in the parallel multi-value neural network can be achieved.

The parallel multi-value neural network 15 which is easily trained with a truth table for a multi-value logic function is applicable to designing large scale multi-value logic circuits. The parallel multi-value neural network 15 in which several combinations of weighting factors are prepared can realize large scale multi-value variable logic circuits with a constant processing delay. The present invention is applicable to pattern recognition associative memories, data compressions, data conversions.

(Embodiment 2)

In a second embodiment of the present invention, a parallel multi-value neural network 83 is provided in which a compensatory teacher signal generator 52, different from the generator 24 in the first embodiment illustrated in FIG. 9 is used. In this second embodiment, only the configuration and the procedure for the compensatory teacher signal generator 52 are given.

Figure 11:
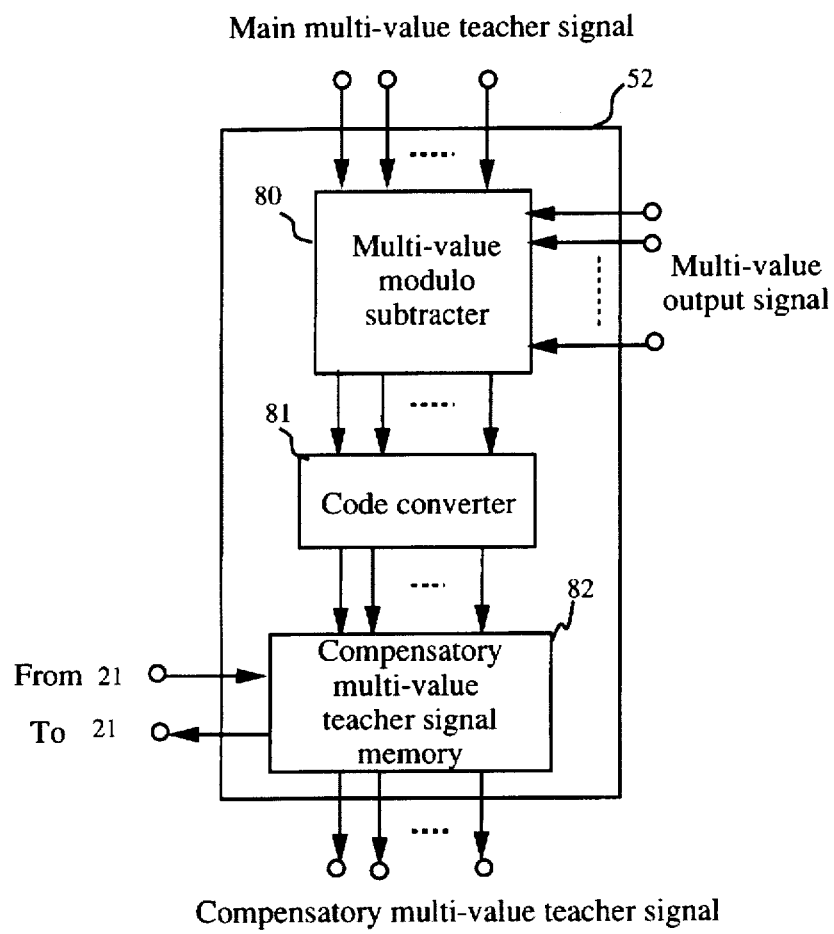
FIG. 11 is a functional configuration of a compensatory multi-value teacher signal generator 52 in a second embodiment of the parallel multi-value neural network 83, according to this invention.

FIG. 11 illustrates the configuration of the compensatory teacher signal generator 52 in the learning process. The compensatory teacher signal generator 52 comprises a multi-value modulo subtracter 80 in which codes consisting of the multi-value errors are obtained by subtracting in modulo the multi-value output signal of the main neural network 16 from the main multi-value teacher signal, as aforementioned, a code converter 81 in which only an all-zero code without errors derived from the multi-value modulo subtracter 80 is converted to a code at a large distance away from the remaining codes, and a multi-value teacher signal memory 82 in which the output from the code converter 81 is stored as the compensatory multi-value teacher signal for the sub neural network 18.

The codes corresponding to multi-value errors include the all-zero code (C0) with all elements having 0 due to the correct output signal, which appears more than 90% in the multi-value output signal of the main neural network 16 which has been trained within a few number of training cycles. When the number of codes corresponding to the multi-value errors exceeds a given threshold or a maximum code weight among codes becomes below a given threshold, the training is terminated. In the multi-value modulo subtracter 80 of the compensatory multi-value teacher signal generator 52, the multi-value errors are then obtained by subtracting in modulo the multi-value output signal of the main neural network 16 from the main multi-value teacher signal T. The predetermined codes in the multi-value errors are converted to codes at large distances away from the remaining codes. The remaining codes are also at small distances away from the all-zero code. Accordingly, the all-zero code can be converted to a code (C1) at a large distance away from the remaining codes in the code converter 81. For example, the all-zero code C0 is converted to the whole elements of the code C1 having R−1. In the case of the main binary teacher signal, C0 having all 0 is converted into C1 having all 1.

The compensatory multi-value teacher signal with a small number of different codes at large distances from each other makes the sub neural network 18 converge more rapidly than the compensatory multi-value teacher signal without the code conversion.

After preparing the compensatory multi-value teacher signal TC, the sub neural network 18 then starts updating the weighting factors in a weighting factor controller 26 so as to minimize the power of the difference of the output signal obtained through a subtracter 25 from the compensatory multi-value teacher signal. The learning process is terminated by a control signal from a mode controller 21, when complete coincidence between the multi-value output signal and the compensatory multi-value teacher signal is detected by a coincidence detector 28.

Figure 10:
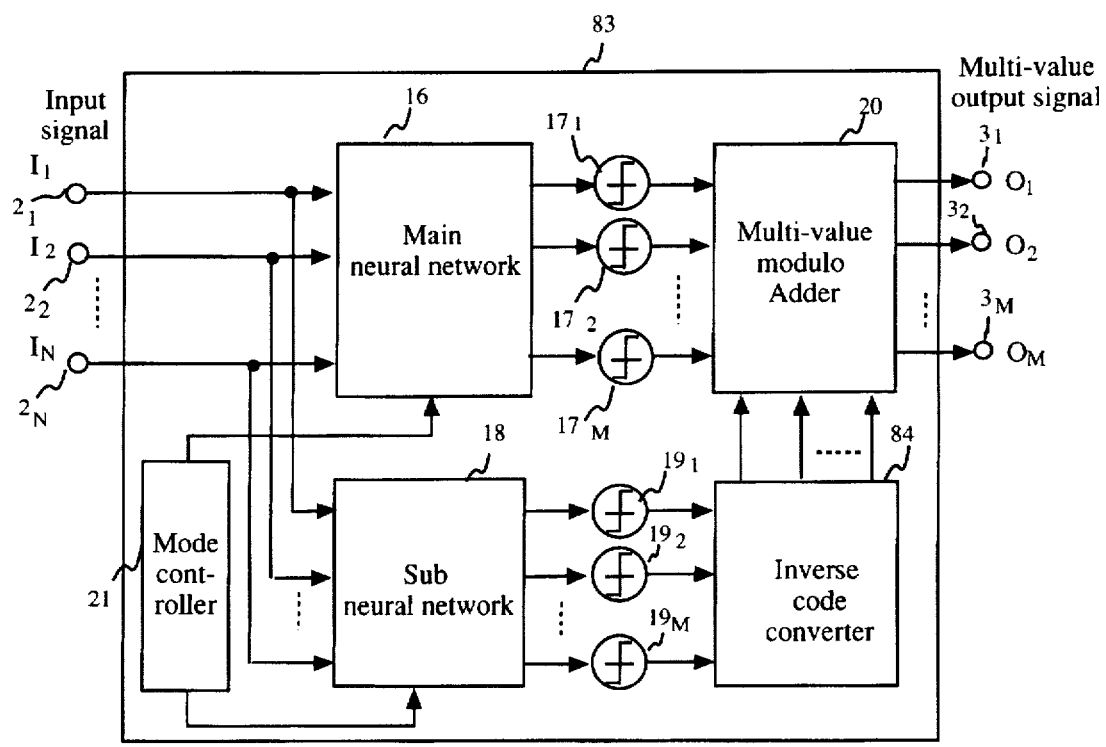
FIG. 10 is a functional diagram of a second embodiment of a parallel multi-value neural network 83 for execution, according to this invention.

The parallel multi-value neural network 83 in the execution process, as illustrated in FIG. 10, comprises the main neural network 16, the sub neural network 18 in parallel, multi-value threshold means 17, 19, a multi-value modulo adder 20, the mode controller 21, and an inverse code converter 84 which restores the code converted in the code converter 81 to the original code.

The parallel multi-value neural network 83 can provide more rapid and complete convergence in the learning process by using the code conversion.

(Embodiment 3)

Figure 12:
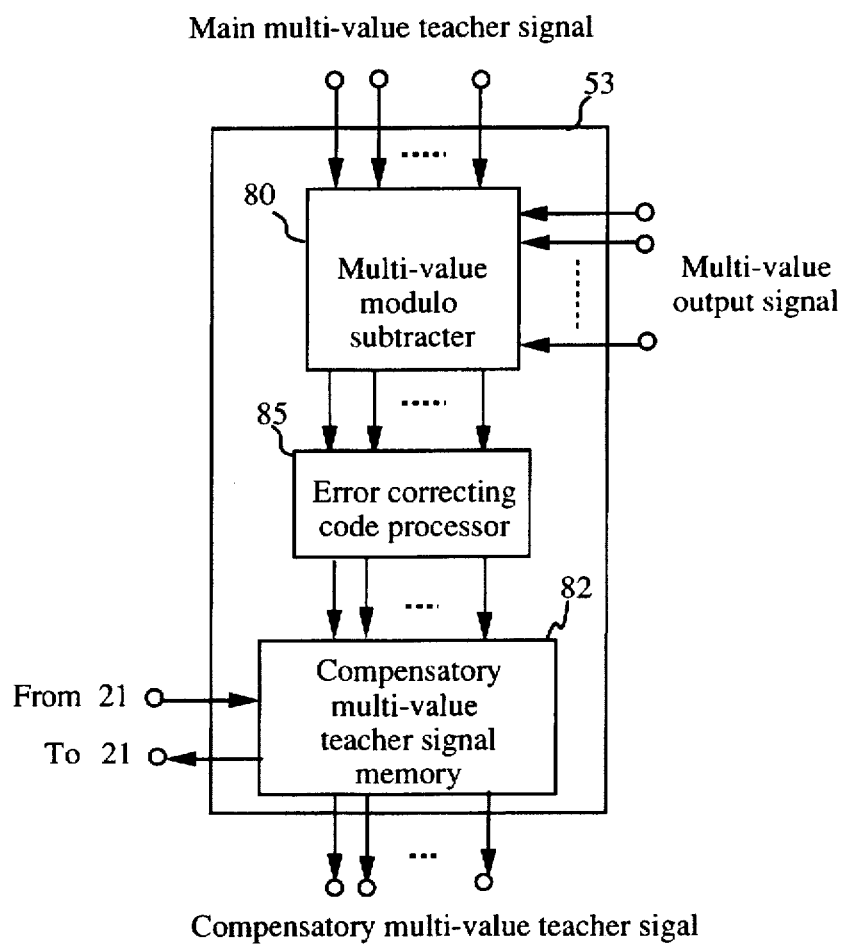
FIG. 12 is a functional configuration of a compensatory multi-value teacher signal generator 53 in a third embodiment of the parallel multi-value neural network for learning, according to this invention.

In the third embodiment of the present invention, a parallel multi-value neural network is provided which uses another compensatory multi-value teacher signal generator 53 for a code conversion. When the number of training cycles of a main neural network 16 is limited to a very small value, the code weight (for example, a Hamming weight for binary code) and the kinds of the erroneous multi-value output signal increase and the occurrence becomes similar to each other. In the compensatory multi-value teacher signal generator 53, a code conversion to expand the code distance in M-ry code space is used. The third embodiment uses a code converter and an inverse code converter different from those in the second embodiment. As illustrated in FIG. 12, an error correcting code processor 85 is applied instead of the code converter 81. The error correcting code processor 85 in the compensatory multi-value teacher signal generator 53 can generate codes having a large distance away from each other with redundant digits by using an error correcting technique, and the codes are stored in a compensatory multi-value teacher signal memory 82 as a compensatory multi-value teacher signal. An error correcting decoder is also used in an inverse code converter 84. The codes processed by the error correcting code processor 85 are accordingly restored to the original codes to be fed to a multi-value modulo adder 20 to correct the multi-value output signal of the main neural network 16 in the execution process. The inverse code converter 84 is provided by a ROM.

In the case of a binary space, the number of kinds k of codes corresponding to the binary errors is much smaller than $2^M$, and $k<<2^M$. The k distinct codes are expressed by K bits, where K is a minimum integer satisfying $Log_2(k) \leq K$. Accordingly, new codes with M bits consisting of K information bits are generated as the compensatory binary teacher signal by an error correcting code technique in the error correcting code processor 85 and stored in the compensatory multi-value teacher signal memory 82. When M=7 and k=7, K becomes 3. The new codes with 7 bits have 3 information bits providing a minimum Hamming distance of 3. In the case of the multi-value, a Lee distance is applied.

The expansion of the code distance expressed by Lee distance or Hamming distance in the compensatory multi-value teacher signal makes the sub neural network 18 converge much more rapidly in the learning process, even if a large amount of errors are included in the multi-value output signal of the main neural network 16 with a very small number of training cycles. The parallel multi-value neural network 83 with the compensatory multi-value teacher signal generator 53 can achieve very rapid convergence.

(Embodiment 4)

Figure 13:
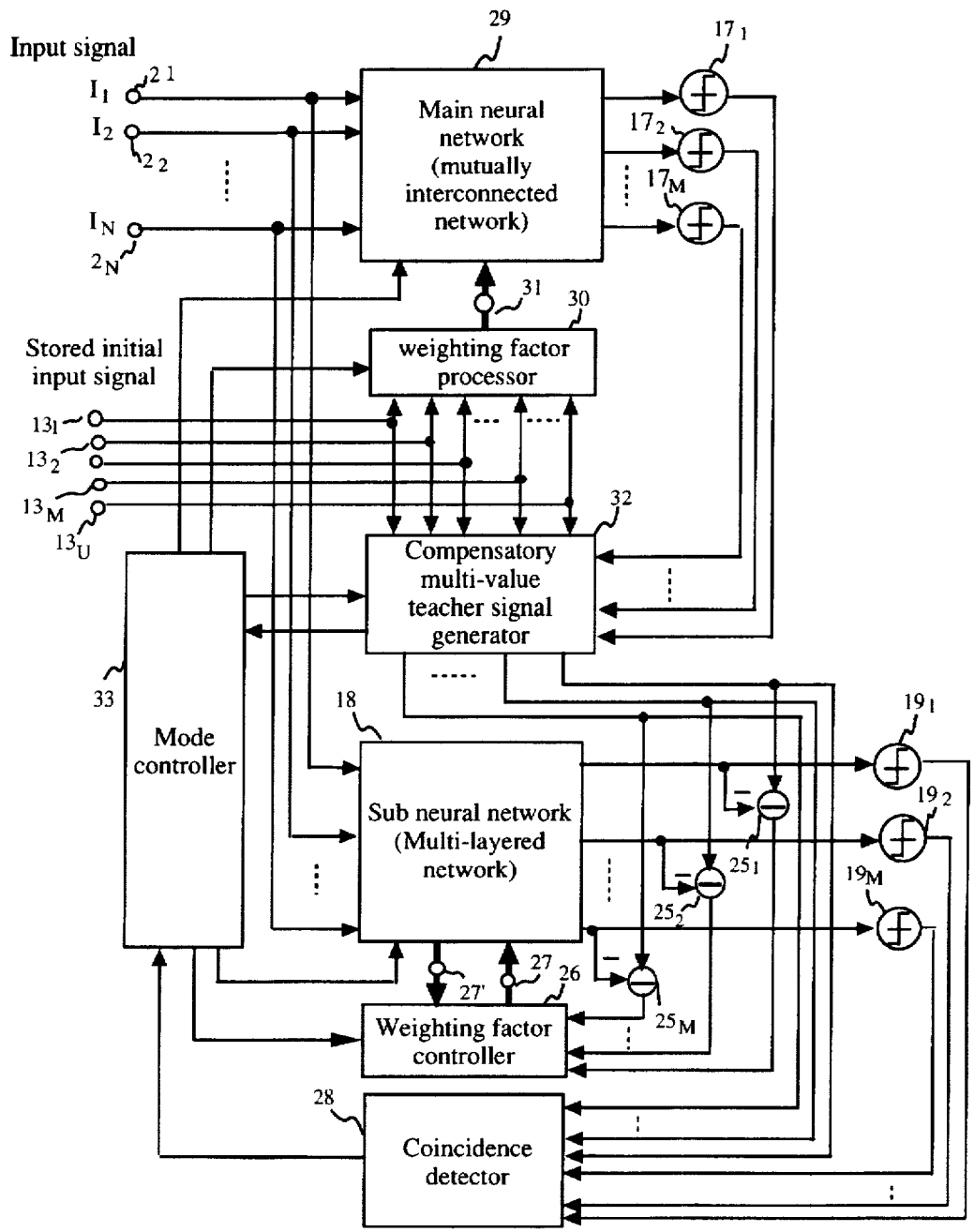
FIG. 13 is a functional diagram of a fourth embodiment of the parallel multi-value neural network for learning, according to this invention.

In the fourth embodiment of the present invention, a parallel multi-value neural network is provided in which a mutually interconnected neural network is applied to a main neural network 16 instead of the multi-layered neural network in embodiment 1. The parallel multi-value neural network is illustrated only for the learning process in FIG. 13.

In the main neural network 29 consisting of a mutually interconnected neural network, weighting factors calculated in a weighting factor processor 30 for a stored multi-value initial input signal including a main multi-value teacher signal are set up. When an equilibrium state of the output signal is achieved for the training input signal, the multi-value output signal is then obtained through a multi-value threshold means 17, and is fed into a compensatory multi-value teacher signal generator 32 with the main multi-value teacher signal. In the compensatory multi-value teacher signal generator 32, the codes corresponding to multi-value errors involved in the multi-value output signal of the main neural network 29, which are different from the main multi-value teacher signal, are obtained as a compensatory multi-value teacher signal for a sub neural network 18 having a multi-layered structure. Until the number of codes corresponding to multi-value errors falls below a threshold level, the learning process is continued by setting up new weighting factors calculated in the weighting factor processor 30 for the increased number of hidden units.

The sub neural network 18 is then trained for updating the weighting factors in the weighting factor controller 26 so as to minimize the power of the difference of the output signal obtained through the subtracter 25 from the compensatory multi-value teacher signal. When coincidence between the compensatory multi-value teacher signal and the multi-value output signal of the sub neural network 18 derived through a multi-value threshold means 19 is detected by a coincidence detector 28, the learning process is terminated. If coincidence is not detected within the predetermined number of training cycles, the number of hidden units is increased and the sub neural network 18 is trained again with the initial conditions.

In the execution process, the multi-value errors involved in the multi-value output signal of the main neural network 29 which has been trained with the training input signal can be completely compensated out by the multi-value output signal of the sub neural network 18 which has been trained, providing coincident with the compensatory multi-value teacher signal.

As it is not necessary to achieve an equilibrium state with complete coincidence between the main multi-value teacher signal and the multi-value output signal of the main neural network 29 in the learning process, and as the compensatory multi-value teacher signal having a very small number of codes different from all-zero is also obtained for learning of the sub neural network 18, the parallel multi-value neural network can be easily converged within a small number of training cycles. The mutually interconnected neural network 29 becomes very simple because it is not necessary to use a large number of hidden units. If the Hopfield or Boltzmann neural network is used, the multi-value modulo adder and subtracter are given by an XOR operation.

(Embodiment 5)

Figure 14:
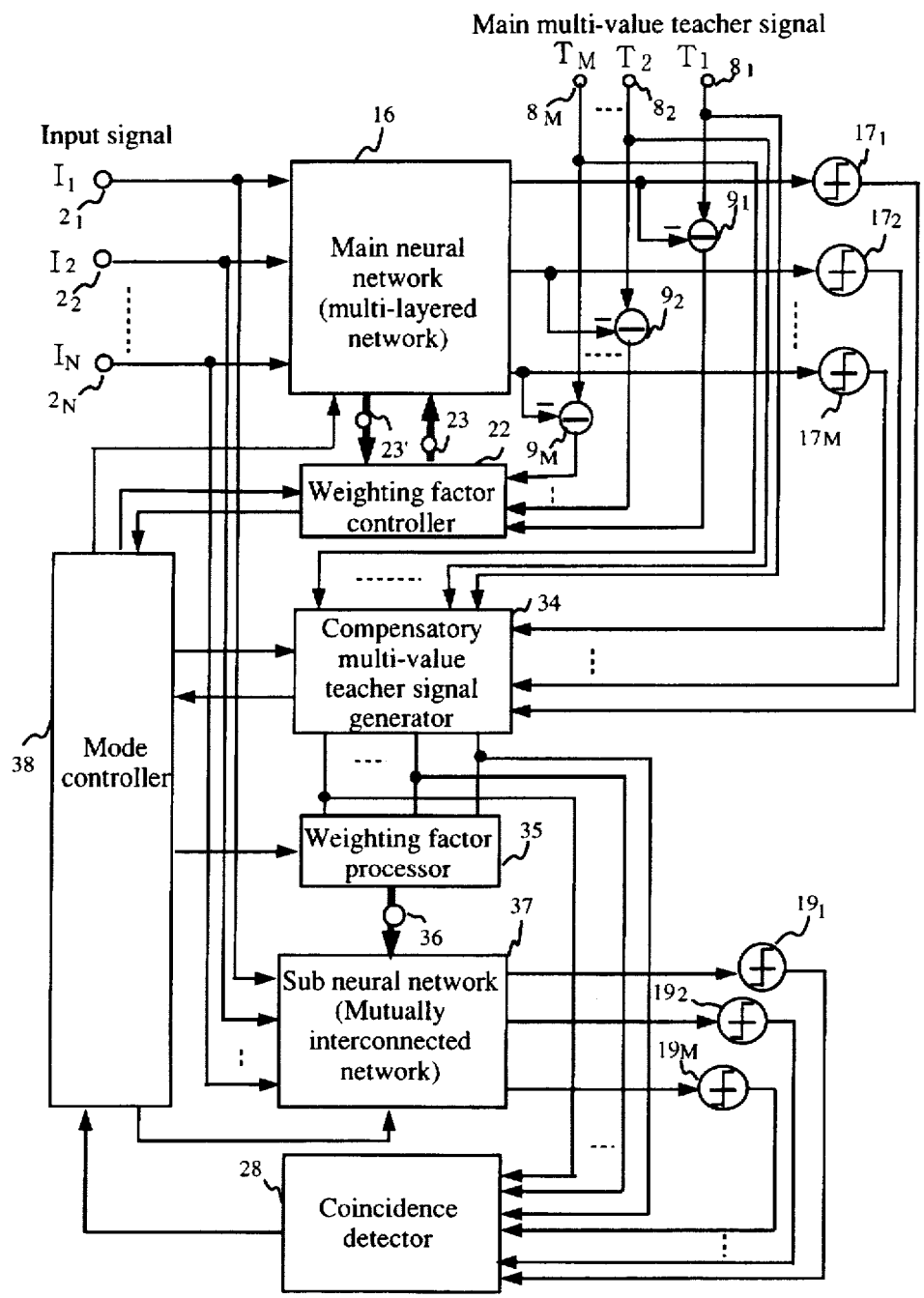
FIG. 14 is a functional diagram of a fifth embodiment of the parallel multi-value neural network for learning, according to this invention.

In the fifth embodiment of the present invention, a parallel multi-value neural network is provided in which a mutually interconnected neural network is applied to a sub neural network 37 instead of the multi-layered neural network in the embodiment 1. The parallel multi-value neural network is illustrated in FIG. 14 only for the learning process.

In the sub neural network 37 consisting of the mutually interconnected neural network, weighting factors calculated in a weighting factor processor 35 for a stored multi-value initial input signal including a compensatory multi-value teacher signal are set up. In a compensatory multi-value teacher signal generator 34, when the number of codes corresponding to multi-value errors involved in the multi-value output signal of a main neural network 16 falls below a given threshold, the learning process is terminated, and the codes including the all zero code are then stored as a compensatory multi-value teacher signal for the sub neural network 37.

The sub neural network 37 in parallel is then trained with the training input signal by using the stored multi-value initial input signal including the compensatory multi-value teacher signal. When coincidence between the compensatory multi-value teacher signal and the multi-value output signal derived through a multi-value threshold means 19 in the equilibrium state is detected by a coincidence detector 28, the learning process is terminated. Until coincidence can be achieved, the weighting factors are re-calculated repeatedly for the increased number of hidden units in the weighting factor processor 35, and are set up in the sub neural network 37 so as to achieve the equilibrium state.

As it is not necessary to achieve coincidence between the main multi-value teacher signal and the multi-value output signal in the main neural network 16 which has been trained with the training input signal, and as the compensatory multi-value teacher signal having a very small number of non zero codes is also used in the sub neural network 37 in the learning process, the mutually interconnected neural network can easily converge to provide the multi-value output signal coincident with the compensatory multi-value teacher signal within a very small number of training cycles.

In the execution process, the multi-value errors involved in the multi-value output signal of the main neural network 16 which has been trained with the training input signal can be completely compensated out by the multi-value output signal of the sub neural network 37 coincident with the compensatory multi-value teacher signal through a multi-value modulo adder 20. The desired multi-value output signal of the parallel multi-value neural network is obtained for the training input signal through the terminal 3.

(Embodiment 6)

Figure 15:
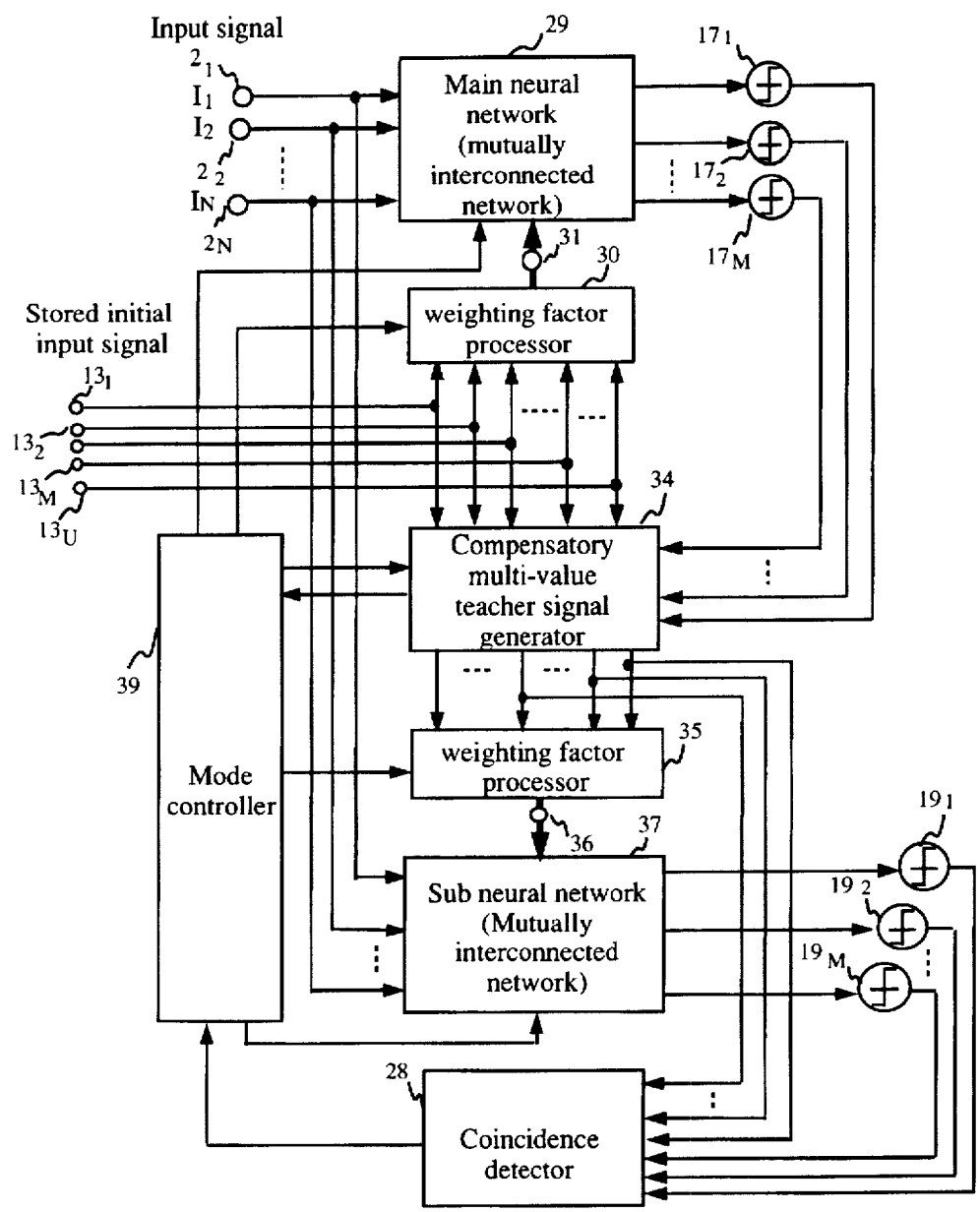
FIG. 15 is a functional diagram of a sixth embodiment of the parallel multi-value neural network for learning, according to this invention.

In the sixth embodiment of the present invention, a parallel multi-value neural network is provided in which mutually interconnected neural networks are applied to both a main and sub neural networks 29 and 37 as illustrated in FIG. 15 for the learning process. The descriptions for the execution process are omitted because of the similarity to those in embodiments 4 and 5.

In the learning process, the weighting factors for a stored multi-value initial input signal including a main multi-value teacher signal fed through terminal 13 are calculated in the weight factor processor 30 and are set into the main neural network 29 as shown in FIG. 15. The main neural network 29 performs in the same way as that in the embodiment 4, codes corresponding to multi-value errors involved in the multi-value output signal of the main neural network 29 derived through the multi-value threshold means 17 are obtained, and are stored as a compensatory multi-value teacher signal in a compensatory multi-value teacher signal generator 34. The stored multi-value initial input signal is fed into the weight factor processor 35 to calculate the weighting factors of a sub neural network 37. When the sub neural network 37 achieves the equilibrium state, the multi-value output signal derived through the multi-value threshold means 19 is compared with the compensatory multi-value teacher signal. If coincidence between them is detected by a coincidence detector 28, the learning process is terminated under the control of a mode controller 39. The calculation of weighting factors is performed repeatedly for the sub neural network 37 with increased number of hidden units until detecting coincidence.

In the execution process, the desired multi-value output signal of the parallel multi-value neural network is output through the terminal 3 without errors for the training input signal by compensating the multi-value errors involved in the multi-value output signal of the main neural network 29 through a multi-value modulo adder.

Mutually interconnected neural networks without using the stored multi-value initial input signal are also applicable to the main neural network 29. The descriptions of the processes in this case are omitted.

(Embodiment 7)

Figure 16:
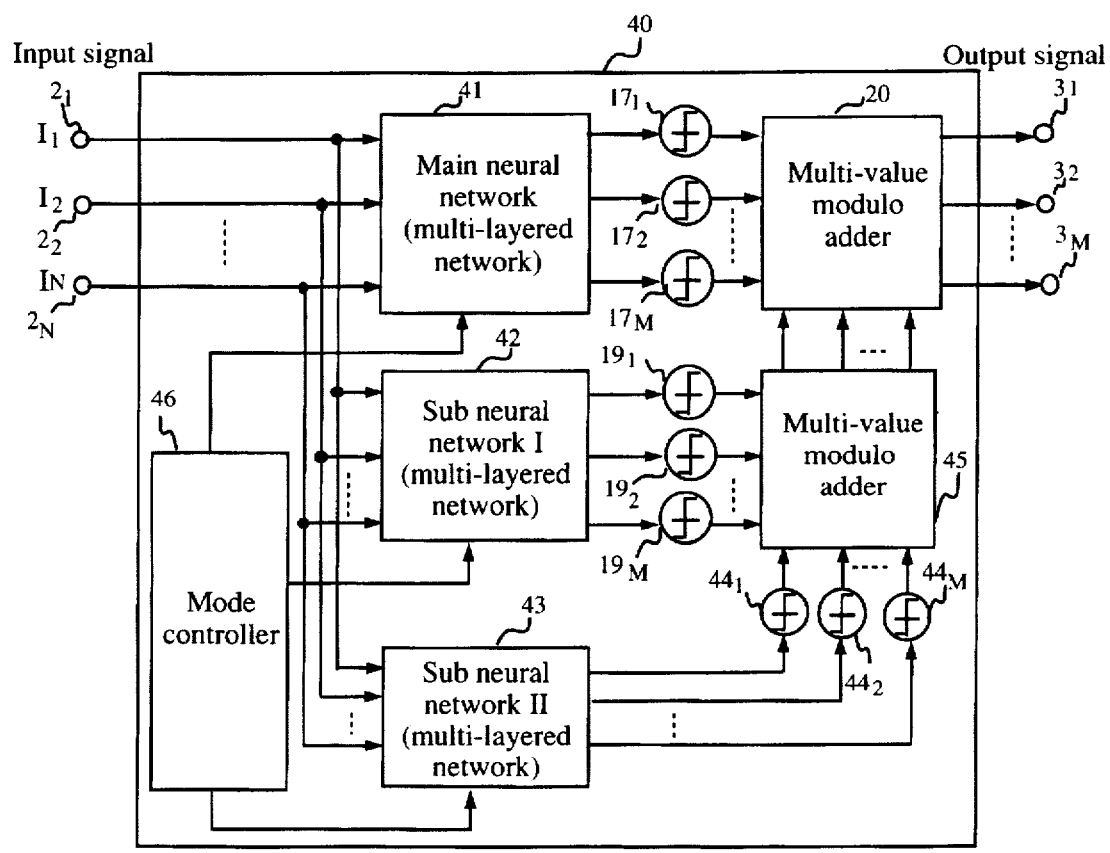
FIG. 16 is a functional diagram of a seventh embodiment of a parallel multi-value neural network 40 for execution, according to this invention.
Figure 17:
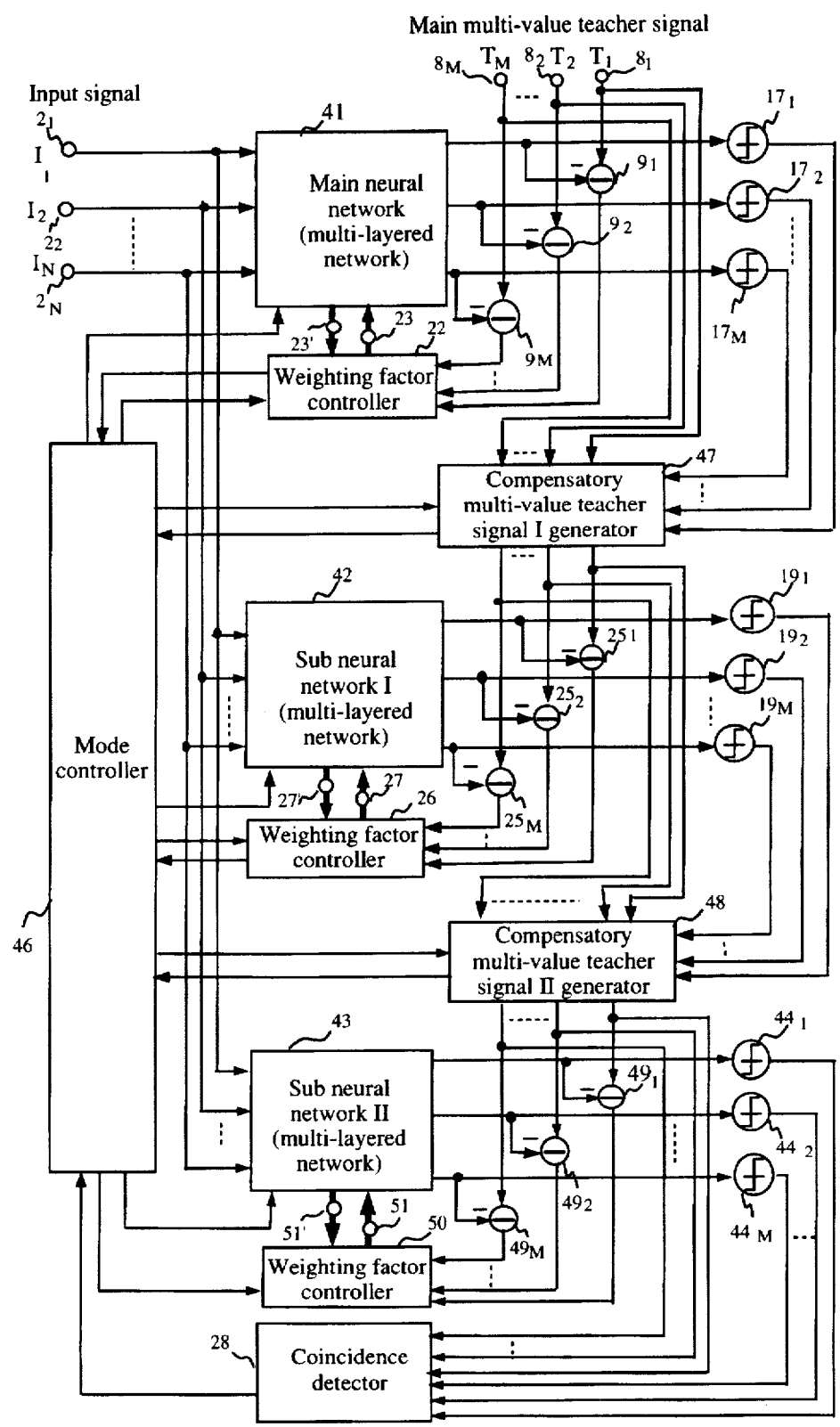
FIG. 17 is a functional diagram of a seventh embodiment of the parallel multi-value neural network 40 for learning, according to this invention.

In the seventh embodiment of the present invention, a parallel multi-value neural network 40 is provided which has two sub neural networks I 42 and II 43 as illustrated in FIG. 16 for the execution process and in FIG. 17 for the learning process, respectively.

The parallel multi-value neural network 40 comprises a main neural network 41, sub neural networks I 42 and II 43 using the multi-layered neural networks in parallel, multi-value threshold means 17, 19, 44, multi-value modulo adders 20, 45 and a mode controller 46 in this embodiment.

When the sub neural network I 42 cannot produce a multi-value output signal completely coincident with a compensatory multi-value teacher signal of the sub neural network I 42 for the training input signal under the conditions of a limited number of training cycles, the sub neural network II 43 is used for producing a multi-value output signal coincident with a compensatory multi-value teacher signal which corresponds to multi-value errors involved in the multi-value output signal of the sub neural network I 42 which has been trained.

The multi-value errors involved in the multi-value output signal of the sub neural network I 42 which has been trained are compensated out for the training input signal through a multi-value modulo adder 45 by adding in modulo the multi-value output signal of the sub neural network II 43 which has been trained to it. The output signal of the multi-value modulo adder 45 therefore becomes the compensatory multi-value teacher signal I of the sub neural network I 42 which has been trained, and can furthermore completely cancel through a multi-value modulo adder 20 the multi-value errors involved in the multi-value output signal of the main neural network 41 which has been trained with training input signal. The correct multi-value output signal of the parallel multi-value neural network 40 is then obtained through a terminal 3.

The learning process in FIG. 17 is very similar to that in embodiment 1. Only the learning process related to the sub neural network I 42 is performed in addition, the other process being the same as those in the embodiment 1. The main neural network 41 starts at first to learn the main teacher signal under the control of the mode controller 46. The learning process is the same as that for the main neural network 16 in the embodiment 1. After learning the main neural network 41, the codes corresponding to multi-value errors are obtained from the main multi-value teacher signal and the multi-value output signal derived through the multi-value threshold means 17, and are then stored in a compensatory multi-value teacher signal I generator 47 as the compensatory multi-value teacher signal I for the sub neural network I 42. The sub neural network I 42 is then trained with the compensatory teacher signal I. The difference between the compensatory multi-value teacher signal I and the output signal of the sub neural network I 42 obtained through a subtracter 25 is used for updating the weighting factors in the weight factor controller 26. When the number of codes corresponding to multi-value errors involved in the multi-value output signal of the sub neural network I 42 falls below a given threshold, the codes derived by subtracting in modulo the multi-value output signal from the compensatory multi-value teacher signal I of the sub neural network I 42 through a multi-value modulo subtracter are stored in a compensatory multi-value teacher signal generator II 48 as a compensatory multi-value teacher signal II of the sub neural network II 43.

The sub neural network II 43 is then trained with the training input signal by using the compensatory multi-value teacher signal II. The difference between the compensatory multi-value teacher signal II and the output signal of the sub neural network II 43 obtained through a subtracter 49 is used for updating the weighting factors in a weight factor controller 50. The compensatory multi-value teacher signal II has only a very small number of non-zero codes, resulting in very rapid convergence within a very small number of training cycles. When the multi-value output signal of the sub neural network II 43 obtained through the multi-value threshold means 44 becomes easily and reliably coincident with the compensatory multi-value teacher signal II, training of the sub neural network II 43 is terminated under the control of the mode controller 46.

In the execution process, the desired multi-value output signal of the parallel multi-value neural network 40 is output through the terminal 3 without errors for the training input signal by compensating through the multi-value modulo adder 20 the multi-value errors involved in the multi-value output signal of the main neural network 41 by the output of the multi-value modulo adder 45.

Neural networks other than the multi-layered neural network for the main and sub neural networks I and II 41,42,43 are also applicable in this embodiment as in embodiments 4 and 6. The type of neural network may be selected according to the application.

This embodiment increases the more freedom of designs for neural networks than the embodiment 1, whereas a more complex configuration is required. The parallel multi-value neural network 40 is very effective for providing flexibility of rapid convergence for the training input signal in designing the neural networks, and also for a wide generalization in real time applications having large scale neural networks in which a only small margin in the number of training cycles for complete convergence exists.

(Embodiment 8)

Figure 18:
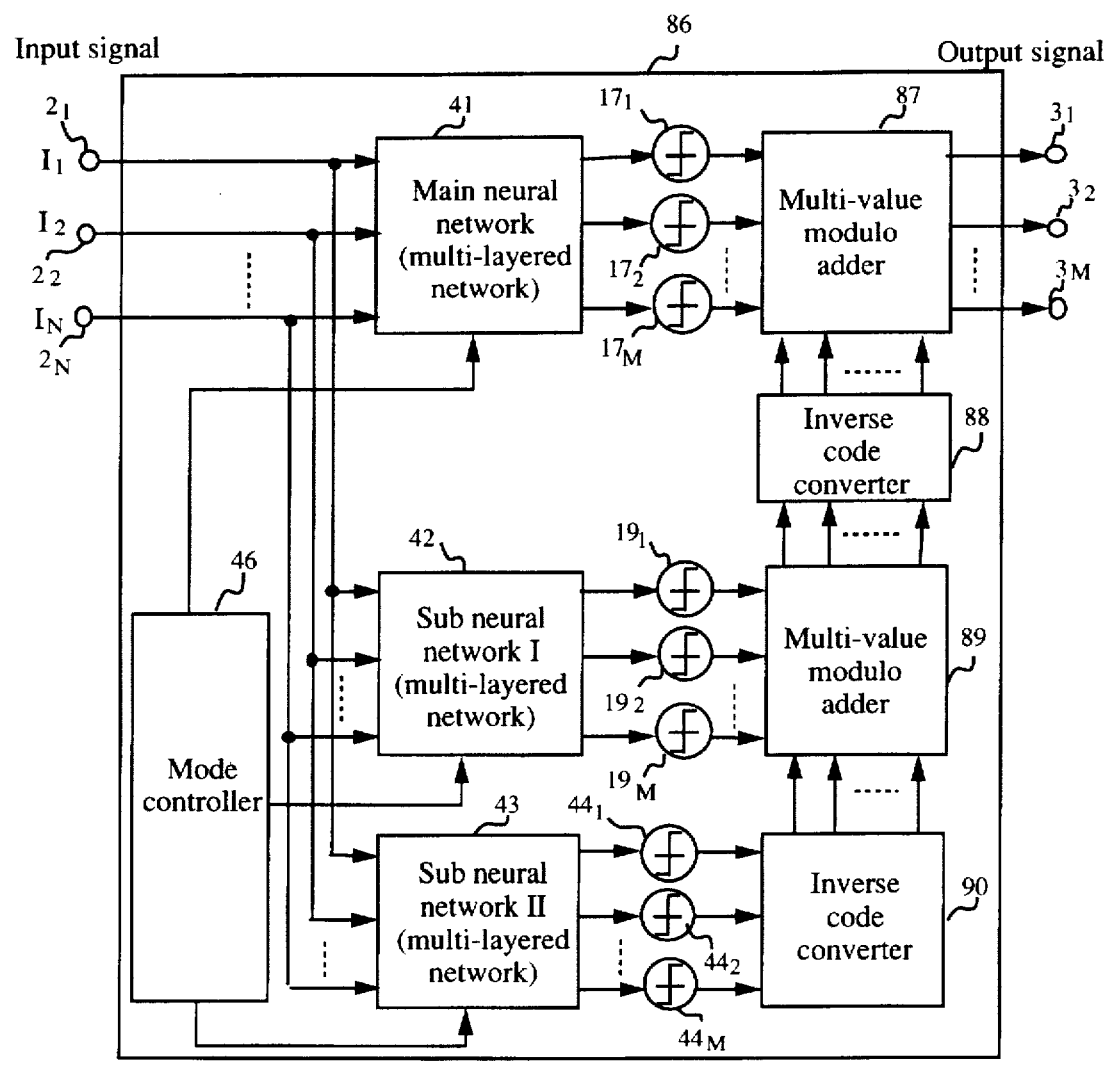
FIG. 18 is a functional diagram of an eighth embodiment of a parallel multi-value neural network 86 for execution, according to this invention.

In the eighth embodiment of the present invention, a parallel multi-value neural network 86 is provided which uses code conversions for significantly improving the convergence speed of the sub neural networks I and II 42, 43 in the embodiment 7 as illustrated in FIG. 18 for the execution process. The parallel multi-value neural network 86 for the execution process comprises a main neural network 41, sub neural networks I and II 42, 43, multi-value threshold means 17, 19, 44, multi-value modulo adders 87, 89, inverse code converters 88, 90 and a mode controller 46. The inverse code converter 88 is inserted between multi-value modulo adders 87, 89 to obtain a multi-value output signal coincident with the multi-value errors involved in the multi-value output signal of the main neural network 41 which has been trained. The output of the parallel multi-value neural network 86 is provided through the multi-value modulo adder 87 by adding in modulo the output of the inverse code converter 88 to the multi-value output signal of the main neural network 41 derived through the multi-value threshold means 17.

Another inverse code converter 90 is also inserted so as to restore the converted codes to the original codes in the multi-value output signal of the sub neural network II 43 derived through the multi-value threshold means 44 to provide codes corresponding to multi-value errors involved in the multi-value output signal of the sub neural network I 42 which has been trained. The multi-value modulo adder 89 outputs the compensatory multi-value teacher signal I of the sub neural network I 42 by adding in modulo the output of the inverse code converter 90 to the multi-value output signal of the sub neural network I 42 derived through the multi-value threshold means 19.

The learning process of the parallel multi-value neural network 86 is the same as that in the parallel multi-value neural network 40, except for the code conversion processes in the compensatory multi-value teacher signal I generator and the compensatory multi-value teacher signal II generator. The sub neural network II 43 can very easily provide a multi-value output signal coincident with the compensatory multi-value teacher signal II.

Codes corresponding to multi-value errors obtained by subtracting in modulo the multi-value output signal of the main neural network 41 from the main multi-value teacher signal, some of which, as aforementioned, are converted to codes at a large distance away from the remaining codes, are stored as the compensatory multi-value teacher signal I for the sub neural network I 42. To obtain the compensatory multi-value teacher signal II, codes corresponding to multi-value errors obtained by subtracting in modulo the multi-value output signal of the sub neural network I 42 from the compensatory multi-value teacher signal I, some of which are also converted to codes at a large distance away from the remaining codes, are stored in the compensatory multi-value teacher signal II generator.

The code conversion to expand the code distance in the compensatory multi-value teacher signals I and II can provide a tremendous improvement of the convergence speed of the sub neural network II 43. Convergence of the parallel multi-value neural network 86 is much faster than that of the parallel multi-value neural network 40. The parallel multi-value neural network 86 is also very effective for providing flexibility of rapid convergence for the training input signal in designing the neural networks with small numbers of hidden units.

This embodiment increases the more freedom of designs for neural networks than the embodiment 7, resulting in realization of a large scale multi-value neural network with very rapid convergence, whereas a more complex configuration is required.

Neural networks other than the multi-layered neural network are also applicable, if these networks are trained by using a compensatory teacher signal derived through a code conversion as in the embodiments 2, 3 and 8.

In above embodiments 1 to 8, neural networks trained by using teacher signals other than multi-layered neural networks or mutually interconnected neural networks for the main and sub neural networks are also applicable in these embodiments. Neural networks without the use of a teacher signal are also applicable to the main neural network in above embodiments. The descriptions of these configurations are omitted.

The advantages of the present invention will now be summarized.

In a parallel multi-value neural network according to the present invention using neural networks connected in parallel, comprising a main neural network, at least one sub neural network, and at least one multi-value modulo adder for compensating an erroneous multi-value output signal of the main neural network, which has been trained, derived through the multi-value threshold means by a multi-value output signal of the sub neural network, which has been trained, derived through multi-value threshold means in the execution process, the desired multi-value output signal of the parallel multi-value neural network is easily obtained for a training input signal.

In successively training the sub neural networks, the use of the compensatory multi-value teacher signal having small kinds of codes at large distances away from each other obtained by the code conversion for the multi-value errors achieves rapid and complete convergence, resulting in a significantly improved training cycles and can provide the desired multi-value output signal of the parallel multi-value neural network for the training input signal.

By designing the small numbers of hidden units of the main and sub neural networks with weighting factors having small bits, a huge reduction of hardware complexity and calculation in the parallel multi-value neural network can be achieved.

The present invention is applicable to designing large scale multi-value logic circuits, and to neural networks for artificial intelligence systems in which complete convergence is necessary, information retrieval systems, data conversions and multi-value image processing. Parallel multi-value neural networks in which several combinations of weighting factors are prepared can realize large scale programmable multi-value variable logic circuits with a constant processing delay.

What is claimed is:

1. A parallel multi-value neural network comprising:

a main neural network which is trained at first with a training input signal by using a main multi-value teacher signal;

at least one sub neural network coupled with said main neural network in parallel for an input signal;

at least two multi-value threshold means, wherein a first multi-value threshold means for providing a multi-value output signal of said main neural network by quantizing an output of said main neural network into a multi-value, and a second multi-value threshold means for providing a multi-value output signal of said at least one sub neural network by quantizing an output of said at least one sub neural network into a multi-value, said at least one sub neural network being trained with said training input signal by using a compensatory multi-value teacher signal, said compensatory multi-value teacher signal is obtained by converting at least a part of multi-value errors to a predetermined code system having codes at larger distances from each other than codes of said at least a part of multi-value errors before conversion, said multi-value errors being a difference between said main multi-value teacher signal and a multi-value output signal of said main neural network which has been trained, said multi-value output signal being derived through said first multi-value threshold means; and at least one multi-value modulo adding means, which adds, in modulo, a) said multi-value output signal of said main neural network which has been trained, said multi-value output signal derived through said first multi-value threshold means, and b) a signal obtained by restoring said predetermined code system to an original code system in an output of said second multi-value threshold means which receives an output of said at least one sub neural network which has been trained, said multi-value modulo adding means providing a desired multi-value output signal by compensating said multi-value errors involved in said multi-value output signal of said main neural network derived through said first multi-value threshold means.

2. A parallel multi-value neural network according to claim 1, wherein:

said predetermined code system is an error correcting code system.

3. A parallel neural network according to any of claims from 1 to 2, wherein:

a last sub neural network learns again for an increased number of hidden units when a multi-value output signal of said last sub neural network derived through said second multi-value threshold means cannot completely coincide with a compensatory multi-value teacher of said last neural network within a given number of training cycles.

4. A parallel neural network according to any of claims from 1 to 2, wherein:

either said main neural network or sub neural networks precedent to a last sub neural network learn again or learn again for increased numbers of hidden units when a multi-value output signal of said last sub neural network cannot completely coincide with a compensatory multi-value teacher of said last sub neural network within a given number of training cycles.

5. A parallel neural network according to claim 1 further comprising a mode controller means for controlling the main neural network and said at least one sub neural network to set weighing factors obtained in a learning process and to perform an execution process.

* * * * *